United States Patent [19]
Grunze et al.

[11] Patent Number: 5,111,575
[45] Date of Patent: May 12, 1992

[54] SWAGING TOOL FOR BEARING INSTALLATION

[75] Inventors: Mark R. Grunze, Naperville; Robert E. Franzen, Wheaton, both of Ill.

[73] Assignee: Rexnord Corporation, Milwaukee, Wis.

[21] Appl. No.: 315,389

[22] Filed: Feb. 24, 1989

[51] Int. Cl.⁵ .............................. B23P 19/04
[52] U.S. Cl. .................. 29/725; 29/243.529; 29/283.5; 72/124
[58] Field of Search ............ 29/283.5, 243.52, 258, 29/263, 509, 522.1, 725, 148.4 R, 148.4 A, 148.4 C, 441.1; 72/125, 126

[56] References Cited
U.S. PATENT DOCUMENTS

| | | | |
|---|---|---|---|
| 3,262,298 | 7/1966 | Samuels et al. | 72/117 |
| 3,444,606 | 5/1969 | Jones | 29/243.52 |
| 3,639,961 | 2/1972 | Shiflet | 29/725 X |
| 3,986,241 | 10/1976 | Ruppe | 29/240 |
| 4,318,212 | 3/1982 | Schnabel | 29/252 |
| 4,428,105 | 1/1984 | Abbott et al. | 29/149.5 B |
| 4,476,617 | 10/1984 | Kobylarz | 29/264 |
| 4,574,448 | 3/1986 | Brandenstein et al. | 29/283.5 |

*Primary Examiner*—Joseph M. Gorski
*Attorney, Agent, or Firm*—Michael, Best & Friedrich

[57] ABSTRACT

An apparatus as provided for swaging a bearing lip into a bearing housing chamfer, which apparatus is operable in confined spaces, such as in an aircraft application. The apparatus is operable without requiring the use of clamps or power tools, wherein an axial swaging force is developed through the bearing bore. The apparatus includes miniature rollers that are supported obliquely for an improved swaging operation.

16 Claims, 2 Drawing Sheets

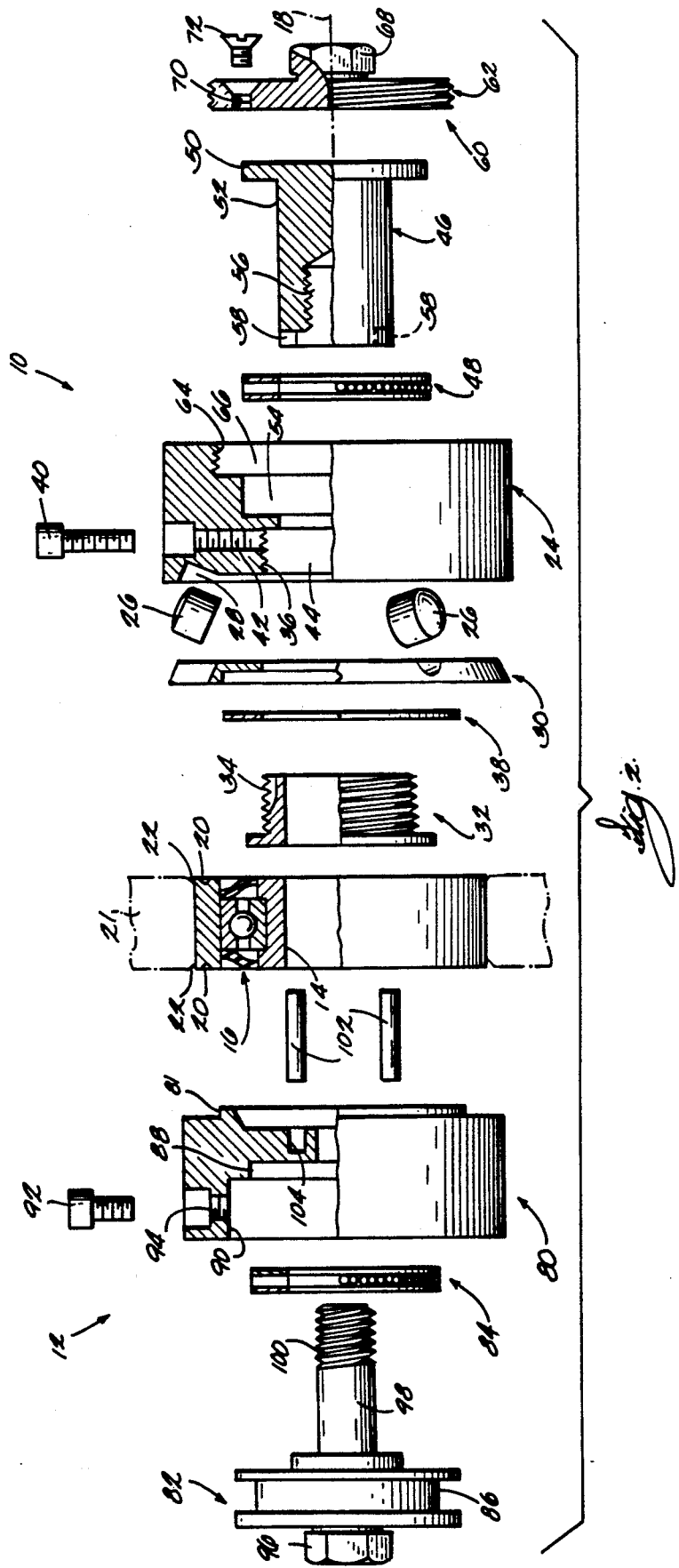

SWAGING TOOL FOR BEARING INSTALLATION

FIELD OF THE INVENTION

The present invention relates to a bearing tool for swaging a bearing lip to a bearing housing chamfer, and more particularly to a bearing tool that is operable in confined spaces without the need for clamps or power tools.

BACKGROUND PRIOR ART

Bearing swaging tools are used, for example, in the aircraft industry to fix bearings in place in bores adapted to house those bearings. The prior art provides several structures for swaging bearings to bearing housings. Attention is directed to the following U.S. Pat. Nos. references: 3,262,298, issued Jul. 26, 1966; 3,444,606, issued May 20, 1969; 3,986,241, issued Oct. 19, 1976; 4,318,212, issued Mar. 9, 1982; 4,428,105, issued Jan. 31, 1984; 4,476,617, issued Oct. 16, 1984; and 4,574,448, issued Mar. 11, 1986.

In the aircraft industry, bearing swaging tools are used not only in fabrication of airplanes but also in installation of replacement bearings during maintenance of the aircraft. In many cases the bearings are located in confined spaces. Many prior art bearing swaging tools are not useful in confined spaces as they require a drill press, or other external structure, such as a C-clamp structure, for application of the axial force required for swaging. Disassembly of the aircraft is normally required if these bearing swaging tools are used.

While U.S. Pat. No. 3,986,241, issued to Ruppe on Oct. 19, 1976, shows a device that causes axial force to be developed through a bearing bore, it teaches use of a motor unit to rotate a conventional roller swaging tool. The complicated structure results in an expensive tool which would also be impractical for use in confined space applications.

Another problem with prior art bearing swaging constructions is improper tracking of rollers about a bearing lip. This is especially a problem with twin wheel configurations such as that shown in U.S. Pat. No. 3,444,606, the use of such wheels resulting in scrubbing. While the roller configuration shown in Ruppe is an improvement over the twin wheel configuration, adjustability of the roller swaging tool for proper tracking is not taught.

SUMMARY OF THE INVENTION

The invention provides a tool for swaging a lip of a bearing into a chamfer of a bearing housing, the bearing having a bore extending therethrough along an axis. The tool comprises a roller fixture assembly adapted to be positioned on one side of the bearing. The roller fixture assembly includes a roller fixture shell and a plurality of swaging rollers obliquely supported by the roller fixture shell for movement around the axis of the bearing bore. The tool further comprises a locating fixture assembly adapted to be positioned on an opposite side of the bearing and adapted to engage the opposite side of the bearing and housing. A first threaded pulling member is included in the roller fixture assembly and a second threaded pulling member is included in the locating fixture assembly. At least a portion of at least one of the first and second pulling members is adapted to extend into the bearing bore to threadedly mate with the other of the first and second pulling members to pull the roller fixture assembly toward the locating fixture and to cause the rollers to apply a force against the bearing lip.

These and other features and advantages of the invention will become apparent upon review of the following detailed description of the preferred embodiment of the invention, which is given by way of example, reference being made to the attached drawings.

BRIEF DESCRIPTION OF THE VIEWS OF THE DRAWINGS

FIG. 2 is an exploded cross-sectional view of a swaging tool embodying the invention, and a bearing and bearing housing.

DETAILED DESCRIPTION OF THE PREFERRED EMBODIMENT OF THE INVENTION

Figure 1:
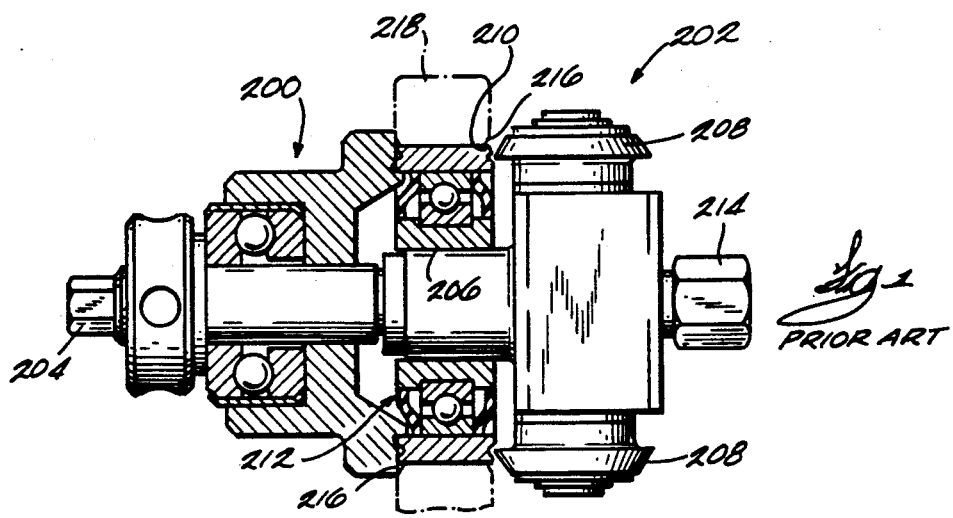
FIG. 1 shows a prior art bearing swaging tool of the twin wheel type.

Referring to FIG. 1, a prior art bearing swaging tool can be seen including a locating fixture 200 and a swaging wheel fixture 202. Rotation of a hex nut 204 of the locating fixture 200 causes the swaging wheel fixture 202 to be drawn toward the locating fixture 200 by a force applied through a bearing bore 206, to draw two wheels 208 against a lip 210 of a bearing 212. This is followed by rotation of a hex nut 214 of the swaging wheel fixture 202 to swage the lip 210 of the bearing 212 into a chamfer 216 of a bearing housing 218. While this design allows a swaging operation to be performed in confined spaces and without power tools or clamps, it has the drawback of twin wheel designs previously mentioned, namely the occurrence of scrubbing with its use.

Accordingly, an object of the present invention is to provide a swaging tool that allows a swaging operation to be performed in confined spaces and without power tools or clamps, but with improved swaging results.

Referring now to FIG. 2, the preferred embodiment of the invention can be seen in exploded form. The swaging tool of the preferred embodiment of the invention comprises two major assemblies which are individually assembled before use of the swaging tool, the major assemblies being a roller fixture assembly 10 and a locating fixture assembly 12 (see FIG. 3).

Figure 3:
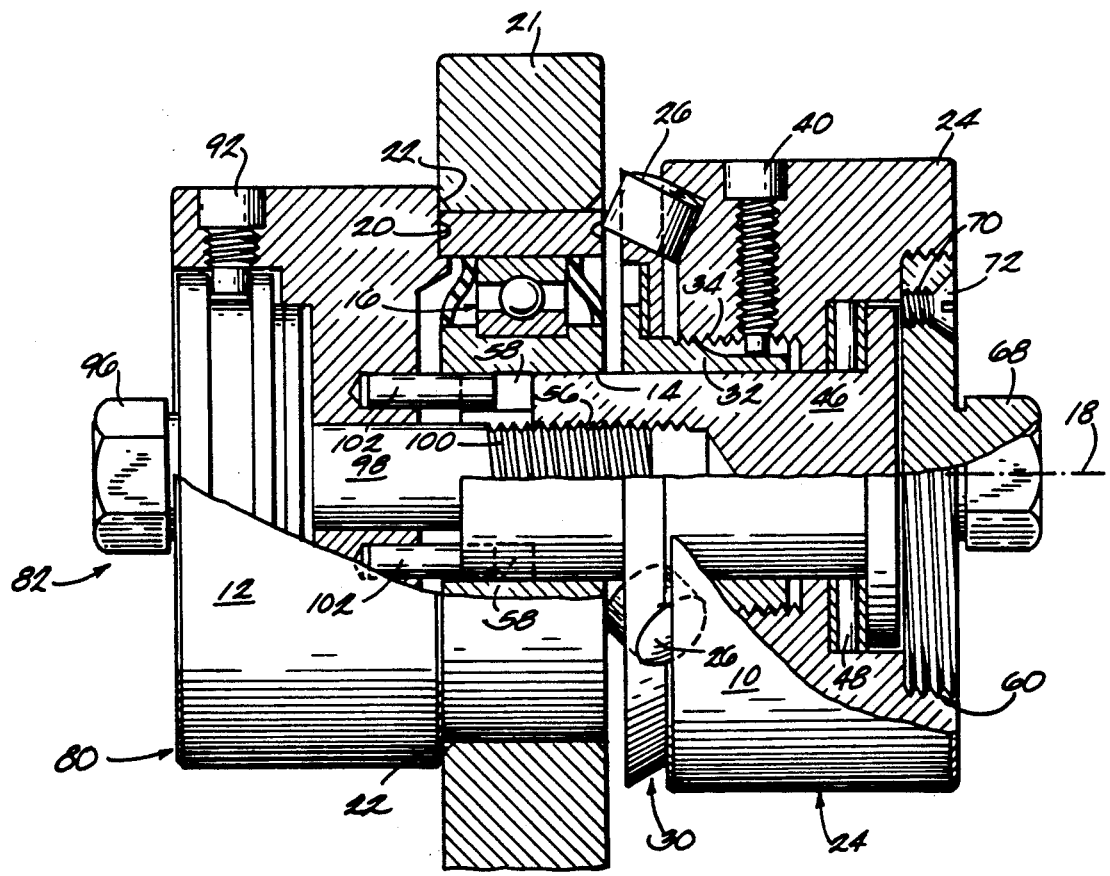
FIG. 3 shows the swaging tool of FIG. 2 in assembled form, positioned for a swaging operation.

As shown in FIG. 3, when assembled, the roller fixture assembly 10 and the locating fixture assembly 12 are tightly threaded together through a bore 14 in a bearing 16. The roller fixture assembly 10 is then rotated about an axis 18 to swage bearing lip 20 into a bearing housing chamfer 22 as will be more clearly understood upon reading the following description of the various components that comprise roller fixture assembly 10 and locating fixture assembly 12, reference being made to FIGS. 2 and 3.

The roller fixture assembly 10 includes a roller fixture body or shell 24 which houses or supports the other components of the roller fixture assembly.

A generally V-shaped groove 28 is circularly formed in one side or face of the roller fixture shell 24 about the axis 18, and is configured to receive rollers 26. Each roller 26 is generally cylindrical in exterior shape and has a circumferential exterior surface which contacts the bearing lip 20 during swaging, a generally planar end, and a convex end opposite the generally planar end. Each roller 26 is positioned in the generally V-shaped groove 28 with at least a portion of its circumferential exterior surface contacting one side of the groove 28, and with its convex end facing away from the axis 18 and making a point contact with the other side of the groove 28. Thus, the groove 28 orients each of the rollers 26 at an angle that is non-perpendicular to the axis 18 so that they apply a swaging force to bearing lip 20 at an angle that is non-parallel to the axis 18.

At least three rollers 26 are retained and separated in the groove 28, in angularly spaced relation, by a retainer ring 30. In the preferred embodiment, three rollers are retained in the groove 28, and are angularly separated by 120° by the retainer ring 30 having three windows, each of which exposes a portion of a roller, and supports the roller for free rotation. A bore having a centerline along the axis 18 passes through the retainer ring 30 for a purpose that will later be more particularly outlined. The specific configuration of the groove 28, the rollers 26, and the retainer 30 of the preferred embodiment of the invention is substantially the same as it is in a roller fixture of a "Shafer Tri-Roller Swaging Tool" manufactured by Rexnord Corporation, Roller Bearing Operation, Downers Grove, Illinois. Further included in the roller fixture assembly 10 is a retainer ring securing screw 32 having a large diameter portion, and a small diameter portion with external threads 34 for engagement with a first set of internal threads 36 provided in the retainer screw receiving area 44 of the roller fixture shell 24. When the roller fixture assembly 10 is assembled, the retainer ring securing screw 32 secures the retainer ring 30 to the roller fixture shell 24, with a washer 38 interposed between the retainer ring securing screw 32 and the retainer ring 30, with the externally threaded small diameter portion passing through a bore in the washer 38 and the bore in the retainer ring 30. In assembly, the washer 38 fits in a recess in the retainer ring 30, which recess is of a larger diameter than the bore through the retainer ring, and the large diameter portion of the retainer ring securing screw 32 abuts the washer 38. A bore having a centerline along the axis 18 passes through the retainer ring securing screw 32 for a purpose that will later be more particularly outlined. In the preferred embodiment of the invention, the retainer ring securing screw 32 and the retainer 30 are made of brass, or another similar bearing material, and the washer 38 prevents brass to brass contact of the retainer ring securing screw 32 with the retainer 30. The axial position of the retainer 30 is adjustable relative to the roller fixture shell 24 by adjusting the amount by which the retainer screw 32 is threaded into the roller fixture shell 24. This allows the retainer-roller clearance to be adjusted for proper tracking of the rollers 26 during a swaging operation. When the rollers 26, the retainer 30, the washer 38 and the retainer securing screw 32 are in place in the roller fixture shell 24, and when the axial position of the retainer securing screw 32, relative to the roller fixture shell 24, is adjusted for proper retainer-roller clearance, the axial position of the retainer securing screw 32 relative to roller fixture shell 24 is fixed by a first set screw 40 which is screwed into a threaded set screw receiving bore 42 of the roller fixture shell 24. The threaded set screw receiving bore 42 communicates with a retainer securing screw receiving area 44 to allow the first set screw 40 to engage the external threads 34 of the retainer securing screw 32. The retainer securing screw 32 could include axially extending exterior slots for receiving the first set screw 40 to positively prevent rotation of the retainer securing screw 32 after its position is adjusted on the roller fixture shell 24.

A series of steps are defined in the side of the roller fixture shell 24 opposite the side having the roller receiving groove 28, which steps are defined by a central bore passing completely through the roller fixture shell 24 and corresponding in diameter and centerline with the bore through the retainer ring securing screw 32, a circular recess 54 having a centerline along the axis 18 and having a larger diameter than the central bore, and a circular recess 66 having a centerline along the axis 18 and having a larger diameter than the circular recess 54. A roller fixture clamping body 46 is configured to be inserted in this side of the roller fixture shell 24. The roller fixture clamping body 46 has an elongate cylindrical body portion 52 which is sufficiently long to pass through a bore which extends through the roller fixture thrust bearing 48, and to pass through the bores in the retainer ring 30, the washer 38, and the retainer securing screw 32, and into the bearing bore 14, when the roller fixture assembly 10 is assembled. The roller fixture clamping body 46 further includes a cylindrical flange portion 50 which, when the roller fixture assembly 10 is assembled, abuts the roller fixture thrust bearing 48. The circular recess 54 in the roller fixture shell 24 provides an area for housing and supporting the thrust bearing 48 and the clamping body flange 50 for free rotation about the axis 18. The roller fixture clamping body 46 further includes a threaded bore 56 along the axis 18 and an offset bore 58 for engagement with the locating fixture assembly 12 as will later be more particularly described. The roller fixture assembly 10 further includes a torque screw 60, which has external threads 62 about its circumference for engagement with internal threads 64 defined in the circular recess 66. When the roller fixture 10 is assembled, the torque screw 60 retains the thrust bearing 48 and the clamping body flange 50 in the recess 54 of the roller fixture shell 24. The depth of the recess 54, in the axial direction, exceeds the combined thickness of the thrust bearing 48 and the clamping body flange 50, so that the torque screw 60 does not impede rotation of the clamping body 46 about the axis 18. The thread direction of internal threads 64 corresponds with the thread direction of the threaded bore 56 in the roller fixture clamping body 46. In the preferred embodiment of the invention, internal threads 64 and internal threads 56 are both clockwise threads. The torque screw 60 further includes a hex nut 68 which is adapted to be engaged by a wrench (not shown), clockwise rotation of the hex nut 68 about the axis 18 causing clockwise rotation of the entire torque screw 60 about the axis 18. A lubrication port 70 is provided in the torque screw 60 and is accessible when a lubrication port access screw 72 is removed from torque screw 60.

The locating fixture assembly 12 includes a locating fixture body or shell 80 which houses or supports the other components of the locating fixture assembly.

One side of the locating fixture shell 80 is adapted to contact the bearing 16, and may include a ridge 81 to aid in the centering of the locating fixture against the bearing 16. The locating fixture shell 80 is also configured to support a clamping screw 82 for rotation about the axis 18, the clamping screw 82 having a small diameter elongate cylindrical portion 98 and a large diameter pulley shaped portion 86; and a thrust bearing 84 adapted to be axially mounted on the elongate portion 98, and adapted to abut the pully shaped portion 86. To this end, a series of steps are formed in the locating fixture shell 80, which steps are defined by: a central bore having a centerline along the axis 18 and having a diameter appropriate for allowing the elongate portion 98 to be rotatably supported therein; a circular recess 88 formed in the side of the locating fixture shell 80 that is opposite to the side adapted to contact the bearing 16, which recess has a diameter that is larger than the central bore through the locating fixture shell 80, and which defines an area for supporting the thrust bearing 84; and a circular recess 90, axially adjacent the recess 88, having a centerline along the axis 18, having a diameter greater than the diameter of the recess 88, and defining an area for supporting the pulley shaped portion 86 of the clamping screw 82. When the locating fixture clamping screw 82 and the thrust bearing 84 are in place in the locating fixture shell, the axial position of the locating fixture clamping screw relative to the locating fixture shell 80 is fixed by a second set screw 92, which is screwed into a threaded set screw receiving bore 94 of the locating fixture shell 80, but which allows the locating fixture clamping screw 82 to rotate about the axis 18 relative to the locating fixture shell 80. The threaded set screw receiving bore 94 communicates with the clamping screw pulley portion supporting area 90 to allow the second set screw 92 to engage the pulley shaped portion 86 of the locating fixture clamping screw 82. The locating fixture clamping screw 82 further includes a hex nut 96 which is adapted to be engaged by a wrench (not shown), rotation of the hex nut 96 about axis 18 in the clockwise or counterclockwise direction causing rotation of the entire locating fixture clamping screw 82 about axis 18 in the clockwise or counterclockwise direction. The locating fixture clamping screw 82 further includes external threads 100 at the end of the elongate portion 98 which is furthest from the pulley shaped portion 86, which threads are adapted to engage internal threads 56 in roller fixture clamping body 46 during preparation for a swaging operation.

At least one pin 102 is configured to extend from the locating fixture shell 80 for engagement with a corresponding offset pin abutment 58 in the roller fixture clamping body 46, in the bearing bore 14. In the preferred embodiment, two pins 102 are press fit in corresponding pin receiving bores 104 in the locating fixture shell 80 to aid in centering the locating fixture assembly 12 in the bearing bore. Although offset pin abutment 58 could be a bore in the roller fixture clamping body 46, a cross-slot is provided in the preferred roller fixture clamping body 46 for engagement with the two pins 102 extending from the locating fixture shell 80.

Referring now to FIG. 3, the interaction of the various components of the swaging tool during a swaging operation will be described. The assembled locating fixture assembly 12 and the assembled roller fixture assembly 10 are positioned on opposite sides of a bearing 16, after the bearing is positioned in a bearing housing 21. The pins 102 of the locating fixture assembly 12 are angularly juxtaposed with the offset pin abutment 58 in the roller fixture assembly 10, in bearing bore 14, and the elongate threaded portion 98 of the locating fixture clamping screw 82 is threaded into the threaded bore 56 of the roller fixture assembly 10 by rotating the locating fixture clamping screw 82 relative to the locating fixture shell 80 of the locating fixture assembly 12. The pins 102 of the locating fixture assembly 12, when angularly juxtaposed with the offset pin abutment 58 of the roller fixture assembly 10, prevent rotation of locating fixture shell 80 relative to the roller fixture clamping body 46 about the axis 18, although roller fixture shell 24 can rotate with respect to the roller fixture clamping body 46. Further rotation of the locating fixture clamping screw 82 relative to locating fixture shell 80 causes roller fixture assembly 10 to be drawn to locating fixture assembly 12, with the rollers 26 of the roller fixture assembly 10 being positioned against the bearing lip 20. The clamping screw hex nut 96 is turned in the clockwise direction by a wrench (not shown) to rotate the locating fixture clamping screw 82 to cause the rollers 26 to be drawn tightly against the bearing lip 20. Torque screw hex nut 68 is turned in the clockwise direction with a wrench (not shown) to cause rotation of the roller fixture assembly 10 relative to the bearing 16, thereby swaging the bearing lip 20 into the bearing housing chamfer 22. Simultaneous clockwise rotation of the clamping screw hex nut 96 and the torque screw hex nut 68 results in simultaneous axial tightening of the roller fixture assembly 10 to the bearing lip 20 and rotation of the rollers 26 about bearing lip 20 for an efficient, accurate swaging operation without the need for clamps or power tools.

While a preferred embodiment of the invention has been given, by way of example, various obvious modifications will become apparent to those skilled in the art. For example, the thrust bearings 84 and 48 could conceivably be omitted; the clamping screw 82 could be permanently encased in the locating fixture shell 80 with only the hex nut 96 exposed; the pulley portion 86 of the clamping screw 82 could possibly be replaced by any means for restricting axial movement of the clamping screw with respect to the locating fixture shell 80 and in the direction of the bearing 16—a radially inwardly extending groove could possibly be provided in the elongate portion 98 for engagement with a reduced diameter portion of the locating fixture shell 80; the pins 102, the pin receiving bore 104, and the pin abutment area 58 could possibly be replaced by any means for preventing rotation of the locating fixture shell 80 with respect to the roller fixture clamping body 46, about the axis 18; the rollers 26 could possibly be permanently retained in the roller fixture shell 24; the flange 50 of the roller fixture clamping body 46 could possibly be replaced by any means for restricting axial movement of the roller fixture clamping body 46 with respect to the roller fixture shell 24 and in the direction of the bearing 16—a radially inwardly extending groove could possibly be provided in the roller fixture clamping body 46 for engagement with a reduced diameter portion of the roller fixture clamping body 46; the roller fixture clamping body 46 could possibly be permanently encased in the roller fixture shell 24; the torque screw 60 could have a larger diameter than the roller fixture shell 24 and could encase the side of the roller fixture shell 24 axially opposite the side adapted to house the rollers 26; the hex nuts 96 and 68 could be replaced by other means allowing rotation of the clamping screw 82 and the torque screw 60 about the axis 18—instead of rotation by wrench, rotation by other manual means such as by allen wrench, or by screwdriver may be possible; and external threads 100 could possibly be replaced with internal threads if internal threads 56 were replaced with external threads. Thus, the scope of the invention should be limited only by the spirit and scope of the appended claims.

We claim:

1. A tool for swaging a lip of a bearing into a chamfer of a bearing housing, the bearing having an axially extending bore therethrough, said tool comprising:
   a roller fixture assembly adapted to be generally positioned on one side of the bearing and including a roller fixture shell having a first side obliquely supporting at least three rollers for engagement with the bearing lip to swage the lip against the bearing housing, said roller fixture assembly further including a roller fixture clamping body supported by said roller fixture shell for rotation about the axis of the bore, relative to said roller fixture shell, said roller fixture clamping body including an axially extending threaded portion at the side thereof axially closest to the bearing bore, the first side of said roller fixture shell having an axially extending bore allowing said threaded portion of said clamping body to be exposed, said roller fixture shell having a second side axially opposite said first side and adapted to be rotated about the axis of the bearing bore, with respect to the bearing;
   a locating fixture assembly adapted to be generally positioned on the other side of the bearing and including a locating fixture shell having a first side adapted to be positioned against the bearing, a second side axially opposite said first side, said locating fixture assembly further including a clamping screw supported by said locating fixture shell for rotation about the axis of the bore, relative to said locating fixture shell, said clamping screw including an axially extending threaded portion at the side thereof axially closest the bearing bore, the first side of said locating fixture shell having an axially extending bore allowing said threaded portion of said clamping screw to be exposed, said threaded portion of said clamping screw being adapted to mate with said threaded portion of said clamping body along the axis of the bearing bore, relative rotation of said clamping screw with respect to said clamping body causing said roller fixture assembly to be pulled toward said clamping fixture assembly to provide a swaging force between said rollers and the bearing lip, a portion of said clamping screw being exposed from said second side of said locating fixture shell and adapted to be rotated about the axis with respect to said locating fixture shell; and
   means for preventing rotation of said locating fixture shell relative to said roller fixture clamping body and about the axis.

2. A tool in accordance with claim 1 wherein said roller fixture assembly further includes a torque screw mounted to said second side of said roller fixture shell to prevent removal of said roller fixture clamping body from said second side of said roller fixture shell, said torque screw being adapted to be rotated about the axis to effect rotation of the roller fixture assembly about the axis relative to the bearing.

3. A tool in accordance with claim 2 wherein said clamping screw and said torque screw are adapted to be rotated by wrench.

4. A tool in accordance with claim 2 wherein said torque screw is threadedly mounted to said roller fixture shell, rotation of said torque screw relative to said bearing in one direction about the axis causing rotation of the roller fixture assembly relative to the bearing, and rotation of said torque screw relative to said roller fixture shell in the other direction about the axis causing said torque screw to be removed from said roller fixture shell.

5. A tool in accordance with claim 1 wherein said threaded portion of said roller fixture clamping body comprises internal threads and said threaded member of said clamping screw comprises external threads.

6. A tool in accordance with claim 5 wherein said external threads and said internal threads are clockwise threads.

7. A tool in accordance with claim 1 wherein said means for restricting rotation of said locating fixture shell relative to said roller fixture clamping body comprises at least one pin extending axially through the bearing bore, offset from the centerline of the bearing bore, and engaging said locating fixture shell and said roller fixture clamping body.

8. A tool in accordance with claim 1 wherein said means for restricting rotation of said locating fixture shell relative to said roller fixture clamping body comprises at least two spaced apart pins extending axially through the bearing bore, offset from the centerline of the bearing bore to aid in centering said clamping screw of said locating fixture with respect to the bearing bore, said pins axially engaging said locating fixture shell and said roller fixture clamping body.

9. A tool for swaging a lip of a bearing into a chamfer of a bearing housing, the bearing having a bore extending therethrough along an axis, said tool comprising;
   a roller fixture assembly adapted to be positioned on one side of the bearing and including a roller fixture shell, a plurality of rollers obliquely supported by said shell for movement around the axis of the bearing bore, and said rollers being adapted to engage the lip of the bearing to swage the lip against the bearing housing;
   a locating fixture assembly adapted to be positioned on an opposite side of the bearing and adapted to engage the opposite side of the bearing and housing; and
   a first threaded pulling member included in said roller fixture assembly and a second threaded pulling member included in said locating fixture assembly, at least a portion of at least one of said first and second pulling members being adapted to extend into the bearing bore to threadedly mate with the other of said first and second pulling members to pull the roller fixture assembly toward the locating fixture and to cause said rollers to apply a force against the bearing lip, said second pulling member in said locating fixture assembly comprising a clamping screw having axially extending, external threads, said clamping screw being supported for rotation relative to the bearing about the axis, said first pulling member in said roller fixture assembly comprising a clamping body having axially extending, internal threads, said clamping body being supported for rotation relative to said clamping screw about the axis and adapted to threadedly engage said clamping screw along the axis of the bearing bore, rotation of said clamping screw relative to said clamping body about the axis causing the roller fixture assembly to be pulled towards the locating fixture assembly, said locating fixture assembly including a locating fixture shell, said clamping screw being housed in said locating fixture for rotation relative thereto about the axis, and said tool further including means for preventing rotation of said locating fixture shell relative to said clamping body about the axis, during a swaging operation, wherein said roller fixture clamping body includes an abutment and wherein said means for preventing rotation of said locating fixture shell relative to said clamping body includes a pin extending axially from said locating fixture shell and at least partially through the bearing bore to engage said abutment on said roller fixture clamping body.

10. A tool in accordance with claim 9 wherein said roller fixture assembly includes a thrust bearing between said clamping body and said roller fixture shell to facilitate rotation of said clamping body relative to said roller fixture shell.

11. A tool in accordance with claim 9 wherein said locating fixture assembly includes a thrust bearing between said clamping screw and said locating fixture shell to facilitate rotation of said clamping screw relative to said locating fixture shell.

12. A tool in accordance with claim 9 further comprising a retainer having a plurality of windows and wherein said rollers are retained in said roller fixture shell by said retainer with a portion of each of said rollers extending through one of said windows to face the bearing, and means for supporting the retainer with respect to said roller fixture shell such that the axial position of said retainer relative to said roller fixture shell is adjustable.

13. A tool in accordance with claim 12 wherein said means for supporting said retainer to said roller fixture shell comprising an axially extending retainer securing screw which threadedly secures said retainer to said roller fixture shell, the axial position of said retainer relative to said roller fixture shell being adjustable to adjusting the amount by which said retainer securing screw is threaded into said roller fixture shell.

14. A tool for swaging a lip of a bearing into a chamfer of a bearing housing, the bearing having a bore extending therethrough, the bore and the bearing lip having a center along an axis, said tool comprising;
 a roller fixture assembly adapted to be positioned on one side of the bearing and including a roller fixture shell having a first side adapted to face the one side of the bearing, said first side of the roller fixture shell having a generally V-shaped groove formed circularly with the axis as a center and adapted to house a plurality of rollers and to position the rollers for engagement with the lip of the bearing to swage the lip against the bearing housing chamfer;
 three generally cylindrical rollers supported in said groove, each of said rollers having a first end, a second end, and a circumferential exterior surface, each of said rollers being adapted to be positioned in said generally V-shaped groove with at least a portion of said circumferential exterior surface contacting one side of said groove, and with at least a portion of said first end of said roller contacting the other side of said groove, said first end facing obliquely away from the axis and having a convex exterior adapted to make a point contact with said groove in said roller fixture shell;
 a locating fixture assembly adapted to be positioned on the opposite side of the bearing; and
 a first threaded pulling member included in said roller fixture assembly and a second threaded pulling member included in said locating fixture assembly, at least a portion of at least one of said first and second pulling members being adapted to extend in the bearing bore to threadedly mate with the other of said first and second pulling members to pull the roller fixture assembly toward the locating fixture and for causing the rollers to apply a force against the bearing lip, said second pulling member in said locating fixture assembly comprising a clamping screw supported for rotation about the axis, relative to the bearing, said clamping screw including an externally threaded portion, and said first pulling member in said roller fixture assembly comprising a clamping body supported by said roller fixture shell for rotation about the axis relative to said roller fixture shell, and including an internally threaded portion communicable with said externally threaded portion of said clamping screw to cause the roller fixture assembly to be pulled towards the locating fixture assembly.

15. A tool in accordance with claim 14 wherein said locating fixture assembly includes a first side adapted to face the bearing, and a second side axially opposite the first side, and wherein said clamping screw is accessible from said second side of said locating fixture and is adapted to be rotated by a manually operable tool.

16. A tool in accordance with claim 15 wherein said roller fixture shell includes a second side axially opposite said first side of said roller fixture shell and wherein said roller fixture assembly further includes a torque screw supported by said second side of said roller fixture shell for rotation with said roller fixture shell about the axis, relative to the bearing, which torque screw is adapted to be rotated by a manually operable tool.

* * * * *